(12) United States Patent
Sheth (10) Patent No.: US 7,922,782 B2
(45) Date of Patent: Apr. 12, 2011

(54) CATALYTIC STEAM GASIFICATION PROCESS WITH RECOVERY AND RECYCLE OF ALKALI METAL COMPOUNDS

(75) Inventor: Atul C. Sheth, Fairfield, CA (US)

(73) Assignee: Greatpoint Energy, Inc., Cambridge, MA (US)

( * ) Notice: Subject to any disclaimer, the term of this patent is extended or adjusted under 35 U.S.C. 154(b) by 957 days.

(21) Appl. No.: 11/421,511

(22) Filed: Jun. 1, 2006

(65) Prior Publication Data

US 2007/0277437 A1 Dec. 6, 2007

(51) Int. Cl.
*C10J 3/46* (2006.01)

(52) U.S. Cl. .......... 48/197 FM; 48/197 R; 48/202; 423/445 R (58) Field of Classification Search ........... 48/197 R
See application file for complete search history.

(56) References Cited

U.S. PATENT DOCUMENTS

| | | | |
|---|---|---|---|
| 2,813,126 | A | 11/1957 | Tierney |
| 2,886,405 | A | 5/1959 | Benson et al. |
| 3,114,930 | A | 12/1963 | Oldham et al. |
| 3,435,590 | A | 4/1969 | Smith |
| 3,531,917 | A | 10/1970 | Grunewald et al. |
| 3,594,985 | A | 7/1971 | Ameen et al. |
| 3,615,300 | A | 10/1971 | Holm et al. |
| 3,689,240 | A | 9/1972 | Aldridge et al. |
| 3,740,193 | A | 6/1973 | Aldridge et al. |
| 3,759,036 | A | 9/1973 | White |
| 3,779,725 | A | 12/1973 | Hegarty et al. |
| 3,828,474 | A | 8/1974 | Quartulli |
| 3,847,567 | A | 11/1974 | Kalina et al. |
| 3,904,386 | A | 9/1975 | Graboski et al. |
| 3,915,670 | A | 10/1975 | Lacey et al. |

(Continued)

FOREIGN PATENT DOCUMENTS

CA 966660 4/1975

(Continued)

OTHER PUBLICATIONS

Asami, K., et al., "Highly Active Iron Catalysts from Ferric Chloride or the Steam Gasification of Brown Coal," ind. Eng. Chem. Res., vol. 32, No. 8, 1993, pp. 1631-1636.

(Continued)

*Primary Examiner* — Alexa D Neckel
*Assistant Examiner* — Imran Akram
(74) *Attorney, Agent, or Firm* — McDonnell Boehnen Hulbert & Berghoff LLP (57) ABSTRACT

A high efficiency gasification process for converting carbonaceous solids to methane and apparatus for its practice are described. The process includes reacting steam and carbonaceous solids comprising ash in the presence of alkali metal catalyst in a gasification reactor to produce combustible gases and char particles comprising ash and alkali metal catalyst constituents, treating a stream of such char particles in an alkali metal catalyst recovery system to recover the catalyst constituents as alkali metal compounds, and recycling such recovered compounds. Within the alkali metal catalyst recovery system the process includes quenching the stream of char particles with water whereby such particles are cooled and fractured, dissolving soluble alkali metal catalyst constituents from the fractured solids to form a first alkali metal catalyst solution and washed solids, optionally reacting the washed solids in alkaline solution to form a second alkali metal catalyst solution, upgrading said first and optional second alkali solution to recover the alkali metal catalyst constituents as said alkali metal compounds.

20 Claims, 1 Drawing Sheet

U.S. PATENT DOCUMENTS

| | | |
|---|---|---|
| 3,920,229 A | 11/1975 | Piggott |
| 3,929,431 A | 12/1975 | Koh et al. |
| 3,958,957 A | 5/1976 | Koh et al. |
| 3,969,089 A | 7/1976 | Moss et al. |
| 3,975,168 A | 8/1976 | Gorbaty |
| 3,985,519 A | 10/1976 | Kalina et al. |
| 3,998,607 A | 12/1976 | Wesselhoft et al. |
| 3,999,607 A * | 12/1976 | Pennington et al. .......... 166/259 |
| 4,005,996 A | 2/1977 | Hausberger et al. |
| 4,021,370 A | 5/1977 | Harris et al. |
| 4,046,523 A | 9/1977 | Kalina et al. |
| 4,053,554 A | 10/1977 | Reed et al. |
| 4,057,512 A | 11/1977 | Vadovic et al. |
| 4,069,304 A | 1/1978 | Starkovich et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,235,044 A | 11/1980 | Cheung |
| 4,243,639 A | 1/1981 | Haas et al. |
| 4,260,421 A | 4/1981 | Brown et al. |
| 4,265,868 A | 5/1981 | Kamody |
| 4,284,416 A | 8/1981 | Nahas |
| 4,292,048 A | 9/1981 | Wesselhoft et al. |
| 4,315,758 A | 2/1982 | Patel et al. |
| 4,318,712 A | 3/1982 | Lang et al. |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,347,063 A | 8/1982 | Sherwood et al. |
| 4,348,486 A | 9/1982 | Calvin et al. |
| 4,348,487 A | 9/1982 | Goldstein et al. |
| 4,353,713 A | 10/1982 | Cheng |
| 4,365,975 A | 12/1982 | Williams et al. |
| 4,375,362 A | 3/1983 | Moss |
| 4,397,656 A | 8/1983 | Ketkar |
| 4,400,182 A | 8/1983 | Davies et al. |
| 4,407,206 A | 10/1983 | Bartok et al. |
| 4,432,773 A | 2/1984 | Euker, Jr. et al. |
| 4,433,065 A | 2/1984 | Van Der Burgt et al. |
| 4,436,531 A | 3/1984 | Estabrook et al. |
| 4,439,210 A | 3/1984 | Lancet |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,500,323 A | 2/1985 | Siegfried et al. |
| 4,508,544 A | 4/1985 | Moss |
| 4,515,604 A | 5/1985 | Eisenlohr et al. |
| 4,515,764 A | 5/1985 | Diaz |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,597,775 A | 7/1986 | Billimoria et al. |
| 4,597,776 A | 7/1986 | Ullman et al. |
| 4,604,105 A | 8/1986 | Aquino et al. |
| 4,609,456 A | 9/1986 | Deschamps et al. |
| 4,617,027 A | 10/1986 | Lang |
| 4,619,864 A | 10/1986 | Hendrix et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,822,935 A | 4/1989 | Scott |
| 4,848,983 A | 7/1989 | Tomita et al. |
| 4,854,944 A | 8/1989 | Strong |
| 4,861,346 A * | 8/1989 | Najjar et al. .................... 44/280 |
| 4,861,360 A | 8/1989 | Apffel |
| 4,876,080 A | 10/1989 | Paulson |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A * | 10/1991 | Sheth et al. ............. 423/244.08 |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,250,083 A | 10/1993 | Wolfenbarger et al. |
| 5,277,884 A | 1/1994 | Shinnar et al. |
| 5,435,940 A | 7/1995 | Doering et al. |
| 5,536,893 A | 7/1996 | Gudmundsson |
| 5,616,154 A | 4/1997 | Elliott et al. |
| 5,630,854 A | 5/1997 | Sealock, Jr. et al. |
| 5,641,327 A | 6/1997 | Leas |
| 5,720,785 A | 2/1998 | Baker |
| 5,733,515 A | 3/1998 | Doughty et al. |
| 5,776,212 A | 7/1998 | Leas |
| 5,855,631 A | 1/1999 | Leas |
| 5,865,898 A * | 2/1999 | Holtzapple et al. ............. 127/37 |
| 6,013,158 A * | 1/2000 | Wootten .......................... 202/99 |
| 6,015,104 A | 1/2000 | Rich, Jr. |
| 6,028,234 A | 2/2000 | Heinemann et al. |
| 6,090,356 A | 7/2000 | Jahnke et al. |
| 6,180,843 B1 | 1/2001 | Heinemann et al. |
| 6,187,465 B1 | 2/2001 | Galloway |
| 6,389,820 B1 | 5/2002 | Rogers et al. |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,855,852 B1 | 2/2005 | Jackson et al. |
| 6,894,183 B2 | 5/2005 | Choudhary et al. |
| 6,955,695 B2 | 10/2005 | Nahas |
| 7,074,373 B1 | 7/2006 | Warren et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0107648 A1 | 5/2005 | Kimura et al. |
| 2005/0137442 A1 | 6/2005 | Gajda et al. |
| 2006/0265953 A1 | 11/2006 | Hobbs |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovister et al. |
| 2007/0277437 A1 | 12/2007 | Sheth |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |

| | | | |
|---|---|---|---|
| 2009/0165376 A1 | 7/2009 | Lau et al. | |
| 2009/0165379 A1 | 7/2009 | Rappas | |
| 2009/0165380 A1 | 7/2009 | Lau et al. | |
| 2009/0165381 A1 | 7/2009 | Robinson | |
| 2009/0165382 A1 | 7/2009 | Rappas et al. | |
| 2009/0165383 A1 | 7/2009 | Rappas et al. | |
| 2009/0165384 A1 | 7/2009 | Lau et al. | |
| 2009/0166588 A1 | 7/2009 | Spitz et al. | |
| 2009/0169448 A1 | 7/2009 | Rappas et al. | |
| 2009/0169449 A1 | 7/2009 | Rappas et al. | |
| 2009/0170968 A1 | 7/2009 | Nahas et al. | |
| 2009/0217575 A1 | 9/2009 | Raman et al. | |
| 2009/0217582 A1 | 9/2009 | May et al. | |
| 2009/0217584 A1 | 9/2009 | Raman et al. | |
| 2009/0217585 A1 | 9/2009 | Raman et al. | |
| 2009/0217586 A1 | 9/2009 | Rappas et al. | |
| 2009/0217587 A1 | 9/2009 | Raman et al. | |
| 2009/0217588 A1 | 9/2009 | Hippo et al. | |
| 2009/0217589 A1 | 9/2009 | Robinson | |
| 2009/0217590 A1 | 9/2009 | Rappas et al. | |
| 2009/0218424 A1 | 9/2009 | Hauserman | |
| 2009/0220406 A1 | 9/2009 | Rahman | |
| 2009/0229182 A1 | 9/2009 | Raman et al. | |
| 2009/0246120 A1 | 10/2009 | Raman et al. | |
| 2009/0259080 A1 | 10/2009 | Raman et al. | |
| 2009/0260287 A1 | 10/2009 | Lau | |
| 2009/0324458 A1 | 12/2009 | Robinson et al. | |
| 2009/0324459 A1 | 12/2009 | Robinson et al. | |
| 2009/0324460 A1 | 12/2009 | Robinson et al. | |
| 2009/0324461 A1 | 12/2009 | Robinson et al. | |
| 2009/0324462 A1 | 12/2009 | Robinson et al. | |
| 2010/0071262 A1 | 3/2010 | Robinson et al. | |
| 2010/0076235 A1 | 3/2010 | Reiling et al. | |
| 2010/0120926 A1 | 5/2010 | Robinson et al. | |
| 2010/0121125 A1 | 5/2010 | Hippo et al. | |
| 2010/0168494 A1 | 7/2010 | Rappas et al. | |
| 2010/0168495 A1 | 7/2010 | Rappas et al. | |
| 2010/0179232 A1 | 7/2010 | Robinson et al. | |

FOREIGN PATENT DOCUMENTS

| | | |
|---|---|---|
| CA | 1003217 | 1/1977 |
| CA | 1106178 | 8/1981 |
| CA | 1187702 | 6/1985 |
| CN | 1477090 | 2/2004 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0 723 930 | 7/1996 |
| EP | 1 001 002 | 5/2000 |
| EP | 1 741 673 | 6/2006 |
| FR | 797 089 | 4/1936 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 2078251 | 1/1982 |
| GB | 2154600 | 9/1985 |
| JP | 54020003 | 2/1979 |
| JP | 56157493 | 12/1981 |
| JP | 62241991 | 10/1987 |
| JP | 62 257985 | 11/1987 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| WO | WO 00/43468 | 7/2000 |
| WO | WO 02/40768 | 5/2002 |
| WO | WO 02/079355 | 10/2002 |
| WO | WO 03/033624 | 4/2003 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | WO 2007/076363 | 7/2007 |
| WO | WO 2007/128370 | 11/2007 |
| WO | WO 2007/143376 | 12/2007 |
| WO | WO 2008/073889 | 6/2008 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |

OTHER PUBLICATIONS

Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From a Thermally Ballasted Gasifier," Aug. 2005.

Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.

Coal Conversion Processes (Gasification), Encyclopedia of Chemical Technology, 4th Edition, vol. 6, pp. 541-566.

Cohen, S.J., Project Manager, "Large Pilot Plant Alternatives for Scaleup of the Catalytic Coal Gasification Process," FE-2480-20, U.S. Dept. of Energy, Contract No., EX-76-C-01-2480, 1979.

Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.

Kalina, T., Nahas, N.C., Project Managers, "Exxon Catalytic Coal Gasification Process Predevelopment Program," Exxon Research & Engineering Company, FE-2369-24, U.S. Dept. of Energy, Contract No. E(49-18)-2369, 1978.

Nahas, N.C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.
Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.
Ohtsuka, Yasuo et al., "Calcium Catalysed Steam Gasification of Yalourn Brown Coal," Fuel, vol. 65, 1986, pp. 1653-1657.
Ohtsuka, Yasuo, et al, "Iron-Catalyzed Gasification of Brown Coal at Low Temperatures," Energy & Fuels, vol. 1, No. 1, 1987, pp. 32-36.
Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.
Ohtsuka, Yasuo et al., "Steam Gasification of Coals with Calcium Hydroxide," Energy & Fuels, vol. 9, No. 6, 1995, pp. 1038-1042.
Pereira, P., et al., "Catalytic Steam Gasification of Coals," Energy & Fuels, vol. 6, No. 4, 1992, pp. 407-410.
Ruan Xiang-Quan, et al., "Effects of Catalysis on Gasification of Tatong Coal Char," Fuel, vol. 66, Apr. 1987, pp. 568-571.
Tandon, D., "Low Temperature and Elevated Pressure Steam Gasification of Illinois Coal," College of Engineering in the Graduate School, Southern Illinois university at Carbondale, Jun. 1996.
"Integrate Gasification Combined Cycle (IGCC)," WorleyParsons Resources & Energy, http://www.worleyparsons.com/v5/page.aspx?id=164.
U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.
Adsorption, http://en.wikipedia.org/wiki/Adsorption, pp. 1-8.
Amine gas treating, http://en.wikipedia.org/wiki/Acid_gas_removal, pp. 1-4.
Coal, http://en.wikipedia.org/wiki/Coal_gasification, pp. 1-8.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources,* vol. 25, pp. 679-687, (2003).
Fluidized Bed Gasifiers, http://www.energyproducts.com/fluidized_bed_gasifiers.htm, pp. 1-5.
Gas separation, http://en.wikipedia.org/wiki/Gas_separation, pp. 1-2.
Gasification, http://en.wikipedia.org/wiki/Gasification, pp. 1-6.
Gallagher Jr., et al., "Catalytic Coal Gasification for SNG Manufacture", *Energy Research,* vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and Cl by leaching of straw char', *Biomass and Bioenergy,* vol. 20, pp. 447-457, (2001).
Mengjie, et al., "A potential renewable energy resource development and utilization of biomass energy", http://www.fao.org.docrep/T4470E/t4470e0n.htm, pp. 1-8.
Meyers, et al. Fly Ash as a Construction Material for Highways, A Manual. Federal Highway Administration, Report No. FHWA-IP-76-16, Washington, DC, 1976.
Moulton, Lyle K. "Bottom Ash and Boiler Slag", *Proceedings of the Third International Ash Utilization Symposium,* U.S. Bureau of Mines, Information Circular No. 8640, Washington, DC, 1973.
Natural gas processing, http://en.wikipedia.org/wiki/Natural_gas_processing, pp. 1-4.
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", *Fuel Processing Technology,* vol. 86, pp. 375-389, (2004).
Reboiler, http://en.wikipedia.org/wiki/Reboiler, pp. 1-4.
What is XPS?, http://www.nuance.northwestern.edu/KeckII/xps1.asp, pp. 1-2.
2.3 Types of gasifiers, http://www.fao.org/docrep/t0512e/T0512e0a.htm, pp. 1-6.
2.4 Gasification fuels, http://www.fao.org/docrep/t0512e/T0512e0b.htm#TopofPage, pp. 1-8.
2.5 Design of downdraught gasifiers, http://www.fao.org/docrep/t0512e/T0512e0c.htm#TopOfPage, pp. 1-8.
2.6 Gas cleaning and cooling, http://www.fao.org/docrep/t0512e0d.htm#TopOFPage, pp. 1-3.

* cited by examiner

Figure 1. Overall flow diagram

CATALYTIC STEAM GASIFICATION PROCESS WITH RECOVERY AND RECYCLE OF ALKALI METAL COMPOUNDS

FIELD OF THE INVENTION

This invention relates to a process for gasifying carbonaceous solids, such as coal, in the presence of alkali metal catalysts to generate product gases, such as methane or syngas, together with a simplified catalyst recovery process.

BACKGROUND

Petroleum is the primary source for liquid and gaseous fuels. It has long been a concern that the availability of petroleum will decline because known petroleum reserves are being consumed and exploration for new reserves is becoming increasingly difficult. Since so many technologies rely on liquid and gaseous fuels, the need to develop processes to produce such fuels from alternative sources is widely recognized.

Several technologies have been developed to address this concern, many focusing on carbonaceous solids, such as coal, petroleum coke, and even organic wastes. Processes have been developed to convert these materials into various combustible gases such as "syngas," a mixture of carbon monoxide and hydrogen, or methane, also known as synthetic natural gas.

The gasification of coal is typically achieved by reacting steam and coal at very high temperature, or at moderate temperatures in the presence of alkali metal catalysts. One such process, to catalytically convert coal to methane, is disclosed in U.S. Pat. No. 4,094,650, which issued on Jun. 13, 1978. The '650 patent discloses that in the presence of a carbon-alkali metal catalyst, carbonaceous solids can be gasified to produce methane in a relatively thermoneutral process.

The alkali metals, including lithium, sodium, potassium, rubidium and cesium, can catalyze coal gasification, either in pure metallic, or compound, or complex form. Generally, the relative activity of the alkali metals as coal gasification catalysts increases with atomic weight, i.e., cesium is the most potent and lithium is the least potent. The development of catalytic coal gasification ("CCG") processes has focused on sodium and potassium since they exhibit reasonable activity while also being less expensive and more widely available than the heavier alkali metals. The coal-catalyst mixture can be prepared and then introduced into a gasification reactor, or can be formed in situ by introducing alkali metal catalyst and carbonaceous particles separately into a reactor.

The alkali metal catalyst can be introduced into a CCG process as an inorganic alkali metal salt, an organic alkali metal salt, an alkali metal hydroxide, an alkali metal oxide, an alkali metal carbonate, an alkali metal bicarbonate, etc., or as a pure metal, or as a mixture of such compounds. The alkali metal catalyst can comprise more than one alkali metal, e.g., potassium and sodium, and can be introduced as a combination of alkali metal compounds, e.g., a mixture of potassium hydroxide, potassium carbonate, and sodium hydroxide, which combination may be eutectic salt mixtures. One preferred alkali metal compound identified in the literature for use in CCG is potassium carbonate.

Coal typically contains significant quantities of inorganic matter including calcium, aluminum, silicon, iron, vanadium, and sulfur, among others. These compounds form inorganic oxides or ash in the gasification reactor. It is known that at temperatures above about 500 or 600° C., potassium (or other alkali metals) can react with the ash to form insoluble alkali aluminosilicates. In this form the alkali metal is inactive or relatively inactive as a catalyst. To prevent a buildup of the inorganic solids in a coal gasification reactor, a solid purge of char, i.e. solids composed of the ash, unconverted carbonaceous material, and alkali bound within the solids, must be periodically withdrawn. This char can be 20% or more by weight, e.g., of the potassium metal, including some as soluble potassium salts such as $K_2CO_3$, and some as insoluble potassium aluminosilicate such as $KAlSiO_4$ (synthetic kaliophilite or kaolinite).

To compensate for losses of catalyst in the solid purge, a traditional CCG process uses a substantial catalyst make-up stream. Raw material costs and environmental implications of a CCG process can be minimized by recovering the alkali metal from the solid purge.

The '650 patent discloses water leaching of the solid purge to recover the soluble portion of the alkali metal. The solids from the gasifier are cooled to 700° F., and then mixed in a rich aqueous solution of the catalyst to dissolve readily soluble material. The enriched aqueous catalyst solution is utilized to prepare the gasifier feed. The once-washed solids are transferred to a multi-stage countercurrent liquid solid extraction system wherein the solids are contacted serially with an increasingly dilute catalyst solution at about 110° C. (230° F.) and 30 psia to recover the less soluble alkali material. The '650 patent discloses a 7-tank battery of mixing vessels with attendant filters, pumps, and make up streams. Insoluble alkali metal compounds such as $KAlSiO_4$ remains in the spent solids, so only about ⅔ of the alkali metal withdrawn in the solid purge can be recovered and recycled to the gasification process.

It is known that insoluble alkali constituents can be recovered from aluminosilicate compounds by "digesting" alkali aluminosilicates in an alkaline solution containing calcium or magnesium, which under proper conditions displace the potassium (or other alkali metals) from the aluminosilicates and form an aqueous solution containing freed potassium (or other alkali metals).

Such a process is utilized in U.S. Pat. No. 4,159,195, which issued on Jun. 26, 1979. According to the '195 patent, the solid purge and solids separated from the raw product gases pass through a fluidizing chamber to separate out and recycle the lighter particles to the gasifier. The remaining heavier particle stream is cooled and directed to a water leaching unit wherein soluble alkali constituents dissolve to form a dilute alkali solution containing a variety of alkali metal compounds such as carbonates and sulfates. The '195 patent states that the water leaching unit typically comprises a multi-stage counter current extraction system, suggesting a complicated process similar to that disclosed by the '650.

The '195 patent warns that the soluble alkali constituents could react with the alkaline components of the digestion process and form undesirable byproducts. To avoid such problems, the '195 patent directs the dilute alkali solution to the gasifier feed preparation zone without further treatment. The leached solids are directed to a lime digestion unit wherein the washed solids are vigorously mixed with aqueous slurry of calcium or magnesium hydroxide at between 250-500° F. (~120-260° C.). According to the '195 patent, the digester product solution normally comprises alkali metal hydroxides and alkali metal aluminates. To avoid recycling aluminates to the gasifier which could increase the ash load, the '195 patent discloses that the digester solution can be contacted with a carbon dioxide containing gas causing the aluminum hydroxide to precipitate before the remaining solution is recycled.

A multi-stage water-wash process with digestion is conventional. The '195 patent reports that greater potassium recovery (than with just a water-wash process) is possible by lime digestion to recover the insoluble moieties. However, pilot scale work on catalyst recovery, sponsored by DOE contract ET-78-C-01-2777 and reported in FE-2777-31, which utilized digestion followed by a multi-stage leaching with water, shows that the addition of lime digestion may not be economically advantageous.

Lime digestion has also been suggested for use in other coal technologies. For example, magnetohydrodynamic (MHD) power generation has been proposed as a technique to increase the efficiency of a conventional coal-fired power plant. In an MHD power plant, a plasma, formed by adding an easily ionizable material to the combustion gases, passes at very high temperature and high velocity through a magnetic field and induces an electric current. According to U.S. Pat. No. 5,057,294 to Sheth et al., which describes a process for recovering and recycling spent seed in an MHD plant, potassium carbonate is a preferred seed material.

According to the '294 patent, most of the potassium seed converts to solid potassium sulfate upon reaction with sulfur dioxide in the combustion gases and can be subsequently recovered as potassium formate by reaction with lime and carbon monoxide in a formate reactor. About 15% of the potassium seed reacts with the aluminum and silicon inorganic components of the coal and forms insoluble potassium aluminosilicates known as MHD "slag." The potassium in the slag can be substantially recovered by crushing the slag particles and digesting them with lime in aqueous phase at a 4:1 molar OH/K ratio and a temperature of 445° F. to 480° F. (about 230-250° C.). The resulting highly alkaline digester product solution of potassium hydroxide is combined with the formate reactor product to precipitate calcium sulfate. The remaining solution with potassium formate and small amounts of potassium hydroxide may be dried and recycled as MHD "seed."

The '294 patent discloses that by grinding the slag to about 75 mesh before it is digested, up to about 80% of the potassium can be recovered. The slag and spent seed can be collected as substantially separate streams. The '294 patent does not address recovery of soluble and insoluble alkali from a single stream of solids. There is no suggestion that the particles could be fractured rather than ground to properly size the particles for digestion.

Thus, the known methods for alkali metal recovery in coal processes are cumbersome and expensive. It would be highly desirable to develop a CCG process capable of recovering alkali catalyst in a simpler system, and it would be even more desirable if such a process were flexible and reliable.

SUMMARY OF THE INVENTION

The process of the present invention is designed to overcome the above-described weaknesses of the prior art. Specifically, the proposed process cools the hot solid purge from gasification to the catalyst recovery temperature, fractures the withdrawn solids into small particles to promote complete leachability of the alkali metal salts, and separates the soluble alkali metal moieties from the solids all in a single vessel. The entire charge of hot solid purge can be treated, so equipment to separate and return the smaller particles to the gasifier may not be required. The present invention utilizes the thermal energy of the hot solid purge to fracture the withdrawn particles upon contact with water without the need for undue grinding equipment. It is believed that the resulting higher surface area of the solids enables soluble alkali moieties to dissolve more readily, reducing or eliminating the need for a multistage water-wash unit. The solids settle and can be readily withdrawn as a concentrated slurry separately from the solution comprising dissolved alkali metal constituents, thereby avoiding the need to utilize a solid liquid separation filter.

It will be seen that the present invention provides a flexible and simplified process to recover and recycle the alkali metal catalyst to a coal gasification reactor. The catalyst recovery process of the present invention usefully employs the energy withdrawn from the gasifier in the hot char particles to fracture the solids into small particles. Moreover, the system of the present application involves less equipment so it can be less expensive to build, less expensive to maintain and operate, and more reliable than a traditional CCG system.

In an embodiment of the present application, the coal gasification process of the present invention has a gasification reactor; a product separations zone; and an alkali metal catalyst recovery system. In the gasification reactor, coal particles and steam are converted in the presence of alkali metal salts to produce gases and char particles comprising unreacted carbon, inorganic constituents of the coal, and alkali metal compounds. A solid purge of char particles is withdrawn from the gasification reactor in an amount sufficient to maintain a steady state load of solid inorganic compounds within the gasification reactor. In the catalyst recovery system, catalyst constituents of the solid purge are recovered for recycle to the gasification reactor.

The catalyst recovery system has a fracturing tank to receive the solid purge stream of hot char particles, to fracture the char particles, and to cool the solid purge stream. Soluble alkali constituents of the char dissolve and separate into a solution. Optionally, a lime digestion unit can be used to breakdown solids withdrawn from the fracturing tank and recover additional insoluble catalyst constituents. The product slurry from the digestion unit, which can include alkali hydroxide compounds, calcium hydroxide, and calcium aluminosilicates, can be combined with the solution from the fracturing tank which can include a variety of alkali compounds including hydroxides, carbonates, bicarbonates, sulfides and sulfates.

In other embodiments, calcium, which can be in the form of, for example, calcium oxide or calcium hydroxide, is fed the gasification reactor and is believed to bind or tie up the alumina and silica components of the coal, such that the solid purge comprises little or no alkali metal aluminosilicates or silicates. In such cases the lime digestion unit could be smaller or omitted entirely.

The solution from the fracturing tank, together with the product slurry from a digestion unit, if present, can be filtered and concentrated and then reacted with a carbon dioxide rich gas to convert the alkali compounds to alkali carbonates. In some embodiments the mixture is carbonated before or concurrent to being filtered. In such case, calcium hydroxide from the digestion unit can be converted to solid calcium carbonate and removed by filtration.

In some embodiments the resulting alkali carbonate solution can be stored and/or recycled as a liquid. Alternatively, the alkali carbonate solution can be dried and the dry alkali carbonate can be stored and/or recycled as a solid.

OBJECTS OF THE INVENTION

Accordingly, it is an object of this invention to simplify the recovery of alkali metal catalyst from the solid purge of a catalytic coal gasification reactor and improves the overall economics.

A further object is to efficiently separate alkali metal catalyst from the solid purge of a CCG reactor to improve the overall efficiency and economics of a CCG process.

A further object of this invention is to provide an alkali metal catalyst recovery process wherein the alkali constituents can be separated from the solid purge of a CCG reactor in a single stage process.

A further object is to utilize the heat of the solid purge to fracture the char particles into smaller particles and thereby promote efficient solubilization of the alkali metal catalyst from the solid purge of a CCG reactor.

Another object is to recover the alkali metal catalyst in a CCG process in a convenient form.

These and other objects of the invention will become apparent from the following description of the invention.

DETAILED DESCRIPTION OF THE VARIOUS EMBODIMENTS

"Alkali metal catalyst" as used herein, refers to alkali compounds that are introduced to the process to facilitate the gasification reactions, and that can be recovered and recycled. The term is not meant to suggest or be limited to the specific moiety or moieties that activate the carbon surface or actually catalyze the gasification reactions.

In the process flow scheme that follows, the present application provides an integrated process for converting coal into product gases such as syngas or methane. The process recovers and recycles alkali metal catalyst and maintains its overall attractiveness in comparison to thermal gasification. Preferably, the process includes zones for feed preparation, gasification, and product purification, and an alkali metal catalyst recovery system.

The feed preparation zone can include a mixing tank for combining coal particles (preferably ground to about 125 mesh by equipment not shown) with an aqueous solution of an alkali metal compound to form a feed slurry. The feed preparation zone also can include a drying tower wherein water is removed from the slurry by superheated steam to form additional steam and a stream of dry solids comprised of coal impregnated with alkali metal catalyst. The feed preparation zone further can include a screw blender wherein coal particles are soaked with aqueous alkali metal salt solution. Alternatively the coal particles can be blended dry with alkali metal compounds. The feed preparation zone can include apparatus to heat the soaked or dry blended coal particles to increase the surface area of carbon in contact with alkali metal catalyst and/or improve the integration of alkali metal catalyst within pores of the coal particles. Still other methods of combining coal particles and an alkali metal catalyst are known, e.g., an alkali metal compound and coal particles can be fed as separate streams directly to the gasifier, without first combining them in a feed preparation zone. The instant invention encompasses all known coal gasification feed preparation techniques. Whether combined or as separate streams, prepared coal particles and an alkali metal catalyst are fed to the gasification reactor.

In the gasification zone, coal and steam are reacted in the presence of an alkali metal catalyst in a reactor ("the gasifier"), to form a raw product stream that can comprise synthesis gas, methane or other carbonaceous stream and unreacted steam. In preferred embodiments the gasifier operates at between about 500° C. and 700° C. The optimal loading of alkali metal catalyst to coal depends on the type of coal, the coal properties, and on the particular gasification conditions, but is typically about 5 to 20 wt %. In certain embodiments, a stream of hydrogen and carbon monoxide is also fed to the gasifier. In some embodiments, a stream of calcium oxide or other calcium compound can be fed to the gasifier.

Coal typically contains inorganic mineral constituents, sometimes called ash, which would not be expected to gasify. Such inorganic mineral constituents may include, for example, alumina and silica. Calcium compounds, if present in the reactor in sufficient quantities, can bind with $CO_2$ and form particles of $CaCO_3$ and/or can bind with the inorganic mineral constituents of the coal and form, for example, calcium aluminosilicates and/or calcium silicates.

During operation, char particles comprised of unreacted carbon, ash constituents of the coal, and alkali metal salts form in the reactor. A solid purge comprising char (and calcium solids, if present) is withdrawn periodically from the gasifier to prevent a buildup of such solids in the gasifier. The solid purge is directed to the catalyst recovery system with recovers alkali constituents of the solid purge as described below.

The raw product gas stream can carry fine entrained char particles as it exits the reactor. The char is separated from the raw product gas stream and directed back to the gasification reactor. The raw product stream is treated further to isolate the products such as syngas or methane. The apparatus and methods for removing unreacted steam and/or acid gases such as hydrogen sulfide and carbon dioxide, if present, and for separating any hydrogen and carbon monoxide, if present, from the raw product stream can be conventional.

The catalyst recovery system includes a fracturing tank which receives the hot char that is periodically or continuously withdrawn from the gasifier. In a preferred embodiment, the fracturing tank is directly below the gasification reactor such that char can be dropped from the bottom of the gasifier into the fracturing tank simply by opening a solids discharge valve. Optionally, the gasifier and the fracturing tank are two compartments of a single vessel.

The fracturing tank can contain a pool of water into which the hot char of the solid purge is dropped. The fracturing tank can alternatively be equipped with water jets which can be directed towards the char particles. Upon contact with the relatively cold pool of water or water jets, the particles can be quickly cooled from the gasifier temperature and it is believed that the high thermal stresses due to the high temperature differential causes the agglomerated char to fracture into small particles. The fractured particles have higher surface to volume ratio, which can enable better solubilization of the alkali metal comprising the solid purge in the alkali metal catalyst recovery process. Proper conditions in the fracturing tank can enable essentially complete dissolution of soluble alkali metal constituents without undue need to grind the withdrawn char. Steam, which evolves from the fracturing tank, can be utilized within the lime digestion unit described below or in the gasifier. A water makeup stream can be fed to the fracturing tank as necessary. The fracturing tank can be designed to minimize the contact time of the solids with water, such as by collecting the water from the water jets separately from the solids in a catch basin, or by providing for any water to immediately drain away from the solids that accumulate at the bottom of the tank.

The char particles can be cooled from gasification temperature to as low as about 50° C. or to as high as about 300° C. by controlling the solids to water ratio and by controlling the contact time of the solids with the water in the fracturing tank.

It is expected that the greatest solid surface area can be attained by contacting the hot char with a pool of water and cooling it to a temperature in the range of about 50° C. to 95° C. Alternatively, better heat integration with the digestion unit, if present, can be attained by cooling the char with water jets such that the solids cool only to a temperature in the range of about 120° C. to 300° C. At the higher temperatures, little heating in a subsequent lime digestion unit would be needed. The present process provides flexibility so the fracturing tank operation may be optimized for the coal properties and conditions in the CCG reactor.

The fracturing tank of the present invention can integrate water washing with cooling. It can be configured such that a substantial amount of the soluble alkali constituents of the char in the solid purge dissolve into solution within the fracturing tank. The soluble alkali metal constituents can thereby form an aqueous solution which can be withdrawn separately from the washed solids that settle to or collect at the bottom of the fracturing tank. According to the present application, the aqueous solution from the fracturing tank can include most of the soluble alkali metal constituents of the solid purge, and the washed solids can include most of the insoluble alkali metal constituents.

The fracturing tank can also be designed such that the washed solids and the solution can be withdrawn separately without undue need for a separate filtration step. The fracturing tank can contain a pool of water into which the hot solids drop, in which case the solids will settle to and can be withdrawn from the bottom of the tank. The tank bottom may have a sloping floor to push the solids together and squeeze out additional liquid from the settled washed solids. In other embodiments, the hot solids may fall through a series of water jets and the fracturing tank can be designed such that the washed solids collect as essentially hot cinders at the bottom of the tank and the water from the jets, after passing through and cooling the falling char particles, can be collected separately or immediately drained from the collected, washed solids.

The catalyst recovery system of the present application can further include a lime digestion unit to provide additional catalyst recovery. The washed solids from the fracturing tank are directed to a lime digestion vessel. An alkaline earth digestion agent such as a calcium or magnesium compound (as, e.g., calcium hydroxide) in aqueous slurry form is added as needed to achieve optimal alkaline OH to alkali metal ratio of 5 to 25. In some embodiments, there can be sufficient calcium in the char such that little or no additional lime is needed. Heat can be provided to the digesters by direct injection of steam. The digester contents are vigorously mixed for 2 to 4 hours at a temperature of about 50° C. to about 300° C. and a pressure of about 10 to about 500 psig. During the digestion process, the digestion agents react with the solids, forming an aqueous alkali metal salt solution (e.g. potassium hydroxide) and insoluble aluminosilicate compounds (e.g. calcium aluminosilicates). By properly synchronizing the charging, mixing, and emptying operations the digestion can be carried out in one step.

The fracturing tank solution, which contains most of the soluble alkali metal constituents which are in the form of hydroxides, carbonates, bicarbonates, sulfides, sulfates and the like can bypass the digester unit and be directed to upgrading processes as described more fully below. The process thereby helps avoid or minimize potential problems or complications arising from introducing the soluble forms to the digestion unit.

The fracturing tank solution and digester product slurry, if present, can be combined as a recovered catalyst solution and upgraded by filtering out the solids, and concentrating the solution in a multiple effect evaporator or similar equipment. Using filter aids if necessary, the filter preferably can remove solids down to a few microns. To convert the alkali metal salts to the carbonate form, the solution is contacted with a $CO_2$ rich gas. The carbonation step will also convert any soluble alkaline earth compounds, such as calcium hydroxide, to the insoluble carbonate form. If salt deposits within the evaporator are a concern, then the carbonation can precede or occur within the filtering step (as in a pressurized filtration unit). In another alternative, the carbonation can occur after the solution is filtered and concentrated.

As noted, by fracturing the hot char particles, the alkali catalyst can be more easily and completely solubilized. Thus, essentially all of the soluble alkali catalyst can be dissolved in the fracturing tank solution, which is a one-stage water wash. Likewise, nearly all of the alkali value of the alkali aluminosilicate or alkali silicate constituents (the insoluble alkali constituents) can be dissolved in the digester product slurry. According to an aspect of the present application, a substantial quantity of the soluble and insoluble alkali constituents can be recovered, upgraded, and recycled without the use of a multistage washing or leaching process.

A purge from the recycle stream helps avoid buildup of undesirables, such as chlorides, phosphates, silicates, etc. An alkali metal catalyst makeup stream is available to replace catalyst lost with the filtered solids or withdrawn in the recycle purge.

If the carbonaceous feed to the gasification process is impregnated with a solution of alkali metal compounds, then further crystallization to recover the alkali metal as a solid catalyst is less necessary. The concentrated alkali metal catalyst solution can be stored and recycled to the gasifier feed as needed. In the alternative, the alkali metal catalyst solution can be directed to a crystallizer/dryer to recover the alkali metal catalyst as a dry compound which can also be stored and recycled to the gasifier feed, as needed.

Figure 1:
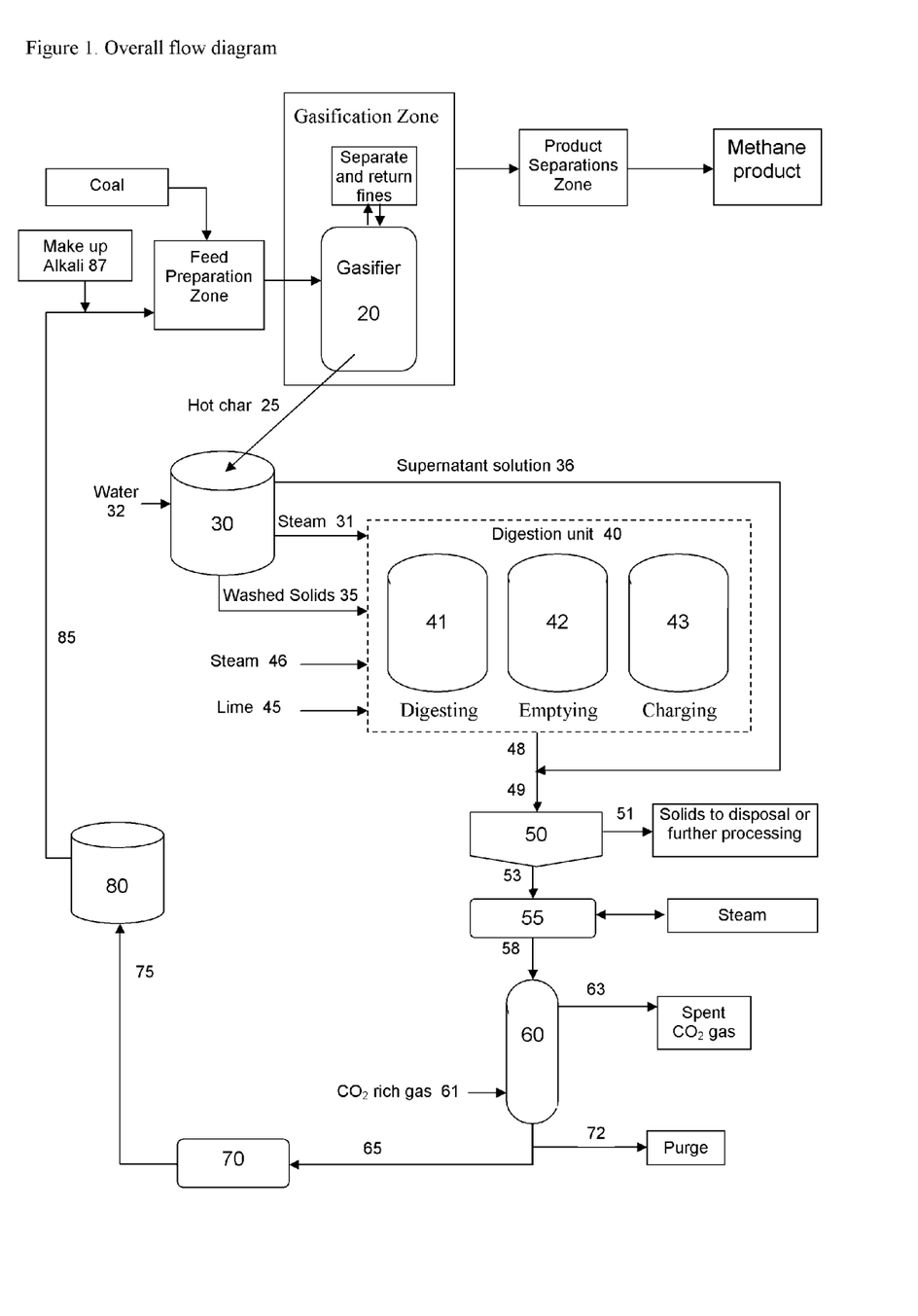
FIG. 1 is a schematic diagram illustrating features of a preferred embodiment of the invention.

Referring to FIG. 1, zones for feed preparation, gasification, and product separation in the catalytic coal gasification process of the present application are shown generally. The alkali metal catalyst recovery system includes a fracturing tank 30, a digester unit 40, a filter 50 and a multiple effect evaporator 55, a carbonation vessel 60 for contacting a solution with carbon dioxide rich gas, a crystallizer/dryer 70 and a recovered alkali metal catalyst storage vessel 80.

In a gasifier 20 processing about 100 tons per day of coal containing about 10% ash and with a 20 wt % catalyst loading, the solid purge can total about 35 tons per day. A conduit 25 for transferring solid purge from the gasifier 20 to the fracturing tank 30 can comprise simply a separation valve which, when open, allows hot solid char particles from the bottom of the gasifier 20 to fall into the fracturing tank which is physically positioned directly below the gasifier and can contain a reservoir of water or water jets aimed at the falling solids. Other means for transferring solids between vessels are known to those skilled in the art. The present application is not limited to said separation valve and is intended to encompass such other solid transfer devices.

Steam that evolves from the fracturing tank can be drawn off through line 31 and usefully employed to transfer heat to the digestion unit 40. Water can be added through line 32.

The digestion unit 40 in a preferred embodiment includes three digester vessels which operate in parallel, but on a staggered sequence such that, for example, one vessel 41 is actively digesting a batch of solids, as another vessel 42 is emptying, and the third vessel 43 is receiving washed solids drawn continuously from the bottom of the fracturing tank 30.

The digestion process sequence is timed such that when a first vessel receiving washed solids is full, a second vessel is empty and can begin receiving washed solids as the first vessel begins the digestion reaction. The sequence continues such that when that second vessel is full of washed solids, the third vessel is empty and can begin receiving washed solids, and when that third vessel is full, the first vessel is empty and can begin being filled, and so forth.

Returning to the flow scheme of FIG. 1, washed solids that settle to or collect at the bottom of the fracturing tank 30 are withdrawn through line 35 to vessel 43 which is in the charging portion of the digestion sequence. Lime is added to charging vessel 43 as needed through line 45. Optimally the hydroxide to alkali metal molar ratio during digestion is about 5 to 25. Steam is added through line 31 and line 46 as necessary to the mixing vessel 41. Optimally, the digestion reaction proceeds at a temperature within the range of about 50 to 300° C.

The product of the digestion reaction process is a slurry comprising an aqueous alkali metal salt solution (e.g. potassium hydroxide), insoluble silicate or aluminosilicate compounds (e.g. calcium aluminosilicates), and unreacted lime. This slurry is discharged from the emptying vessel 42 through line 48 and combined with the fracturing tank solution which is drawn from fracturing tank 30 through line 36. The combined stream of recovered alkali metal catalyst solution in line 49 is directed to a filtration unit 50.

The filtration unit comprises a filter bed designed to remove most of the solids with or without the use of filter aids. Solids are withdrawn through line 51 and can be sent for further processing, or to disposal. The filtered alkali metal catalyst solution is directed through line 53 to a multiple effect evaporator 55 or similar equipment which concentrates the catalyst solution. Optimally, the evaporator 55 reduces the water content of the solution to about 40-50% strength.

The concentrated solution is then directed through line 58 to a carbonator 60 equipped with multiple trays or baffles or packing material, as necessary, to ensure good gas-liquid contact. The solution is fed through line 58 to the top of carbonator 60 and flows from tray to tray as a $CO_2$ rich gas, fed through line 61 to the bottom of carbonator 60, bubbles through or otherwise extensively contacts the falling liquid. Gas depleted in $CO_2$ is withdrawn from the carbonator through line 63. The carbonated solution flows through line 65 to crystallizer/dryer 70 wherein the solution is dried. The solids as flakes or deposited particles are transferred through line 75 to storage vessel 80. A purge can be withdrawn from line 72.

The recovered solids are transferred via line 85 to the feed preparation zone. Make-up alkali metal compound is added through line 87, as needed.

As will be seen from the above, the invention disclosed herein provides an efficient process for separating the alkali metal catalyst from solids purged from a coal gasification reactor, and for recycling such alkali metal catalyst to the coal gasification reactor.

Advantageously, by utilizing the heat of the hot char withdrawn from the gasifier to fracture the solids into small particles, the present application enables recovery of the soluble and insoluble alkali metal catalyst constituents of the char particles without a complicated multistage water wash or digester unit and without undue grinding the char, or with no grinding at all.

The catalytic coal gasification systems of the present application involve fewer steps and less equipment than a traditional CCG system, and can be more economical to build and operate and more reliable.

While particular embodiments of the present invention have been illustrate and described herein in conjunction with a particular flow diagram and operating conditions, it should be apparatus that various modifications and substitutions can be made thereto or incorporated and embodied as part of the present invention without departing from the spirit and scope of the present invention. No limitation should be imposed other than those indicated by the following claims.

The invention claimed is:

1. A process for the gasification of carbonaceous solids, said process comprising:
    contacting carbonaceous solids in particulate form with steam in the presence of an alkali metal catalyst in a reactor wherein raw product gases are formed and char particles are produced, said char particles containing carbon, inorganic constituents, and alkali metal catalyst constituents,
    withdrawing a stream of said raw product gases from said reactor,
    recovering a product gas stream from said stream of said raw product gases,
    contacting a stream of char particles from said reactor with water in a fracturing unit whereby said char particles fracture and a portion of said alkali metal catalyst constituents dissolve into said water to form a fracturing unit solution and washed solids,
    withdrawing from said fracturing unit a stream of said washed solids and a stream of said fracturing unit solution, wherein said stream of water washed solids is withdrawn at a temperature in the range of about 50° C. to about 300° C.

2. The process of claim 1, further comprising:
    reacting said stream of washed solids with a solution of alkaline earth compounds at a temperature in the range of about 50° C. to about 300° C. to form a slurry of spent solids,
    combining said slurry of spent solids with said stream of fracturing unit solution to form a catalyst recovery stream,
    filtering and carbonating said catalyst recovery stream to recover a stream of alkali carbonate compounds, and
    recycling said alkali carbonate compounds for contacting with said carbonaceous solids.

3. The process of claim 2, wherein said slurry of spent solids is not treated to a multi-stage water wash prior to recycling said alkali carbonate compounds recovered therefrom.

4. The process of claim 1, further comprising:
    filtering and carbonating said stream of fracturing unit solution to recover a stream of alkali carbonate compounds, and
    recycling said alkali carbonate compounds for contacting with said carbonaceous solids.

5. The process of claim 4, wherein said stream of fracturing unit solution is not treated to a multi-stage water wash prior to recycling said alkali carbonate compounds recovered therefrom.

6. The process of claim 2 or 4, wherein said alkali carbonate compounds comprise potassium carbonate or sodium carbonate.

7. The process of claim 2, wherein said solution of alkaline earth compounds comprises calcium hydroxide, and the molar ratio of calcium hydroxide to alkali metal in the washed solids is from about 5 to about 25.

8. The process of claim 2 or 4, wherein said carbonating follows said filtering.

9. The process of claim 2 or 4, wherein said carbonating is conducted by exposing said catalyst recovery stream to a stream comprising carbon dioxide.

10. The process of claim 1, wherein said product stream comprises methane.

11. The process of claim 1, wherein said product stream comprises syngas.

12. The process of claim 1, wherein said contacting a stream of char particles from said reactor with water in a fracturing unit comprises water jets impinging upon said stream of char particles.

13. The process of claim 1, wherein said contacting a stream of char particles from said reactor with water in a fracturing unit comprises said stream of char particles falling into a pool of water.

14. The process of claim 2 or 4, wherein said alkali carbonates are recycled as an aqueous solution.

15. The process of claim 2 or 4, further comprising drying said stream of alkali carbonate compounds and recycling said alkali carbonate compounds as solids.

16. The process of claim 1, wherein said stream of water washed solids is withdrawn at a temperature in the range of about 50° C. to about 95° C.

17. The process of claim 1, wherein said stream of water washed solids is withdrawn at a temperature in the range of about 125° C. to about 300° C.

18. The process of claim 1, wherein the carbonaceous solids contain aluminosilicate constituents.

19. The process of claim 1, wherein the carbonaceous solids comprise coal.

20. The process of claim 1, wherein the carbonaceous solids are coal.

* * * * *